UNITED STATES PATENT OFFICE.

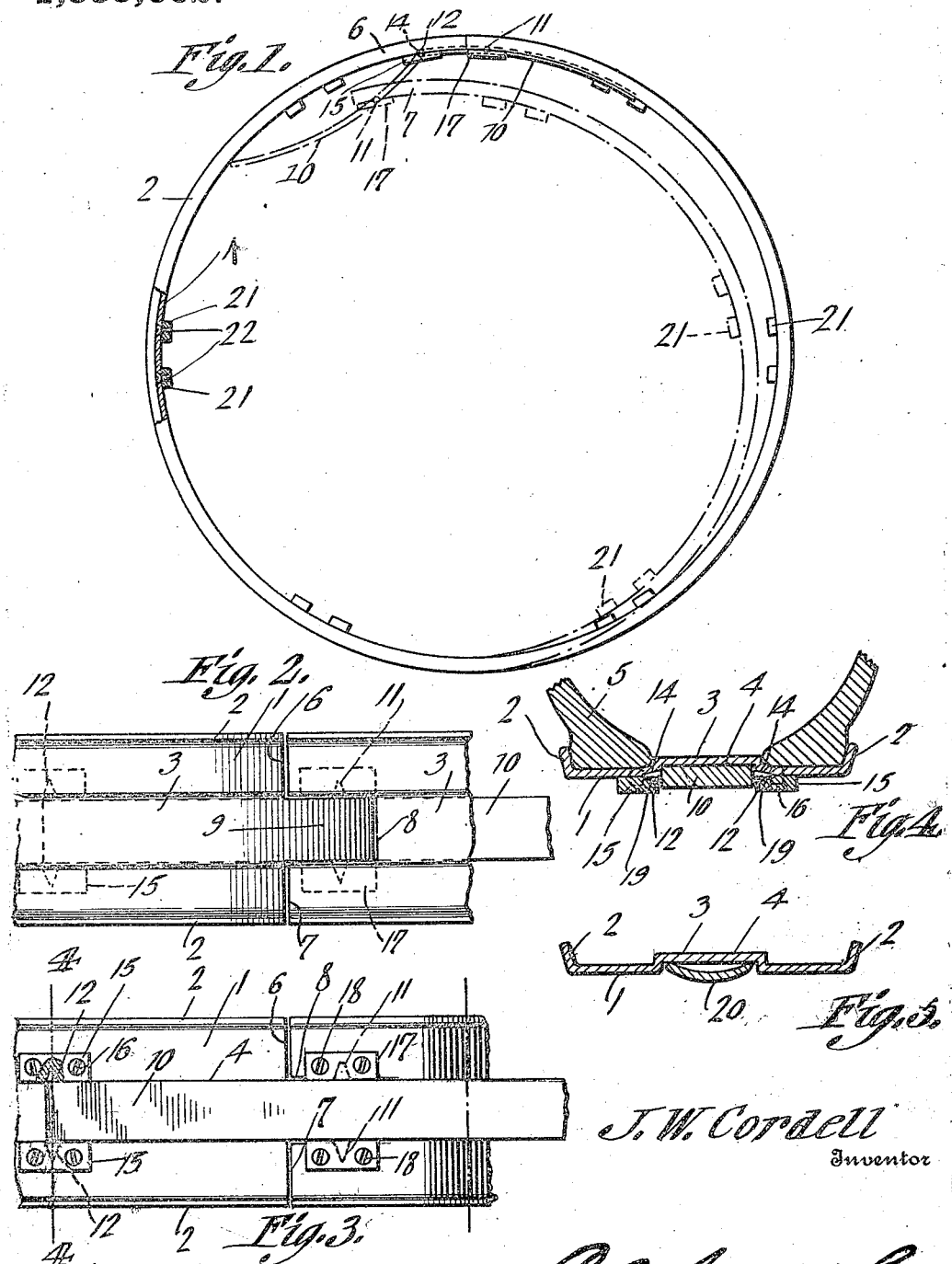

JAMES WILEY CORDELL, OF TALLADEGA, ALABAMA.

WHEEL-RIM.

1,335,662.

Specification of Letters Patent.  Patented Mar. 30, 1920.

Application filed December 18, 1917. Serial No. 207,714.

*To all whom it may concern:*

Be it known that I, JAMES W. CORDELL, a citizen of the United States, residing at Talladega, in the county of Talladega and State of Alabama, have invented a new and useful Wheel-Rim, of which the following is a specification.

The device forming the subject matter of this application is a demountable rim, and one object of the invention is to improve the rim by constructing the same in such a way that it cannot creep circumferentially of the main rim upon which it is mounted. Another object of the invention is to improve the lever mechanism whereby the ends of the rim are connected and manipulated, the rim embodying novel features whereby the rim is reinforced, the tire casing retained, and the lever received when the ends of the rim are brought together.

It is within the province of the disclosure to improve generally and to enhance the utility of devices of that type to which the invention appertains. The drawings show merely a preferred embodiment of the invention, and changes, such as a mechanic might make, may be incorporated without departing from the spirit.

In the drawings:—

Figure 1 shows in side elevation, a demountable rim constructed in accordance with the invention, parts appearing in section;

Fig. 2 is a fragmental top plan showing a portion of the rim;

Fig. 3 is a fragmental bottom plan showing a portion of the rim;

Fig. 4 is a cross section taken approximately on the line 4—4 of Fig. 3;

Fig. 5 is a cross section taken approximately on the line 5—5 of Fig. 3.

The rim forming the subject matter of this application is made, preferably, of resilient metal, and comprises a body 1 having side members or flanges 2, the body being struck upwardly to form a reinforcing rib 3 extended entirely around the rim circumferentially and defining a recess 4 on the inner curve of the rim. The logitudinal edges of a tire casing 5 rest on the body 1 between the side members 2 and the edges of the rib 3, and are restrained and held by these parts.

The tire includes relatively movable ends 6 and 7. The rib 3 has a notch 8 located at the end 7, the rib 3 having its outer wall prolonged beyond the end 6 to form a tongue 9 received in the notch 8 when the ends 6 and 7 are brought together.

The numeral 10 marks a lever provided at its sides with pointed trunnions 11 and 12. In the end 6 of the rim, at the places where the rib 3 merges into the body 1, transverse seats 14 are formed, the trunnions 12 being pivotally received in the seats. The trunnions 12 are overlapped by retainers 15 held in place by securing elements 16, the retainers having seats 19, complemental to the seats 14 and receiving the trunnions 12 pivotally. The trunnions 11 are attached pivotally to the end 7, by a mechanism like that described above in connection with the trunnions 12, and including retainers 17, disposed on opposite sides of the notch 8, and securing elements 18 whereby the retainers are held on the end 7 of the rim.

When the rim is opened as shown in Fig. 1, the lever 10 swings into the notch 8. When the rim is closed, the lever is received in the recess 4. Adjacent its free end, the lever 10 may be curved transversely as shown at 20 in Fig. 5, to reinforce the lever, and for the purpose of permitting a tool or the end of a finger to be inserted readily between the lever and the end 7 when it is desired to swing the lever into the position shown in Fig. 1.

The rim may be supplied with spaced transverse projections 21, held in place by securing devices 22. The projections are adapted to coöperate with the wedges or other accessible parts on a main rim, and, coöperating with such parts, prevent the demountable rim hereinbefore described from creeping circumferentially of the main rim.

When the lever is swung from the dotted line position of Fig. 1 to the position indicated in Fig. 3, the tongue 9 enters the notch 8 and affords a closure therefor, the tongue serving to take up side strains and to prevent lateral movements of the ends 6 and 7, as well as reducing the strain on the lever 10.

Having thus described the invention, what is claimed is:

A demountable rim comprising a body having relatively movable ends and provided intermediate its edges with a circumferential rib of inverted trough-shape, the rib including side portions, the constituent material of the rim being distorted to form particonical seats, portions of which are disposed in the same planes with the side portions of the rib; a lever forming a connection between the ends of the rim and having trunnions received in the seats, the lever fitting within the rib; and retainers extended across the recesses and secured to the rim, the retainers constituting means for holding the trunnions in the seats.

In testimony that I claim the foregoing as my own, I have hereto affixed my signature in the presence of two witnesses.

JAMES WILEY CORDELL.

Witnesses:
   Ivy E. Simpson,
   M. Lawton.